United States Patent
Kang et al.

(10) Patent No.: US 9,251,319 B2
(45) Date of Patent: Feb. 2, 2016

(54) METHOD AND APPARATUS FOR USING NON-VOLATILE STORAGE DEVICE

(75) Inventors: Bo-Gyeong Kang, Gyeonggi-do (KR); Moon-Sang Kwon, Seoul (KR); Byung-Rae Lee, Seoul (KR); Jae-Bum Lee, Gyeonggi-do (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 13/547,446

(22) Filed: Jul. 12, 2012

(65) Prior Publication Data

US 2013/0019109 A1   Jan. 17, 2013

(30) Foreign Application Priority Data

Jul. 12, 2011 (KR) .................. 10-2011-0069158
Mar. 15, 2012 (KR) .................. 10-2012-0026367

(51) Int. Cl.
*G06F 12/14* (2006.01)
*G06F 21/10* (2013.01)
*G06F 21/30* (2013.01)
*H04L 9/32* (2006.01)

(52) U.S. Cl.
CPC ..................... *G06F 21/10* (2013.01)

(58) Field of Classification Search
CPC ... H04L 67/10; H04L 63/0428; H04L 9/0869; G06F 21/60; G06F 21/10; G06F 21/602; G06F 12/1408; G06F 2221/2107; G11B 20/0021
USPC ....... 380/255, 277; 709/217; 713/189; 726/2, 726/26
See application file for complete search history.

(56) References Cited

U.S. PATENT DOCUMENTS

| 8,175,978 | B2* | 5/2012 | Endoh ............................. 705/59 |
| 2002/0026321 | A1 | 2/2002 | Faris et al. |
| 2003/0152222 | A1* | 8/2003 | Nakano et al. ................ 380/201 |
| 2004/0131181 | A1* | 7/2004 | Rhoads ............................ 380/37 |
| 2004/0236917 | A1 | 11/2004 | Miyahara et al. |
| 2005/0086501 | A1 | 4/2005 | Woo et al. |
| 2005/0132209 | A1* | 6/2005 | Hug et al. ..................... 713/189 |
| 2006/0026105 | A1* | 2/2006 | Endoh ............................. 705/59 |

(Continued)

FOREIGN PATENT DOCUMENTS

| CN | 101661441 | 3/2010 |
| EP | 1 855 280 | 11/2007 |

(Continued)

OTHER PUBLICATIONS

European Search Report dated Mar. 26, 2015 issued in counterpart application No. 12811466.7-1870.
Chinese Office Action dated Oct. 30, 2015 issued in counterpart application No. 201280044445.9, 14 pages.

*Primary Examiner* — Michael Chao
*Assistant Examiner* — Shiuh-Huei Ku
(74) *Attorney, Agent, or Firm* — The Farrell Law Firm, P.C.

(57) ABSTRACT

A method and apparatus for using a non-volatile storage device includes reading device identification information from the non-volatile storage device, application identification information corresponding to a content application related to a type of content to be protected or utilized among a plurality of content applications is acquired, usage identification information is generated using the device identification information and the application identification information, and protecting or utilizing content using the usage identification information.

13 Claims, 8 Drawing Sheets

(56) References Cited

U.S. PATENT DOCUMENTS

| | | | |
|---|---|---|---|
| 2006/0294031 A1* | 12/2006 | Muller et al. | 705/404 |
| 2007/0043667 A1 | 2/2007 | Qawami et al. | |
| 2008/0201642 A1* | 8/2008 | Chong et al. | 715/736 |
| 2010/0039915 A1 | 2/2010 | Ueda et al. | |
| 2010/0313034 A1* | 12/2010 | Senshu et al. | 713/185 |
| 2011/0016317 A1* | 1/2011 | Abe | 713/169 |

FOREIGN PATENT DOCUMENTS

| | | |
|---|---|---|
| JP | 2005-514703 | 5/2005 |
| KR | 1020020012538 | 2/2002 |
| KR | 1020050095204 | 9/2005 |
| KR | 1020080043402 | 5/2008 |
| WO | WO 2007/128418 | 11/2007 |
| WO | WO 2007/128481 | 11/2007 |
| WO | WO 2011/020088 | 2/2011 |

* cited by examiner

METHOD AND APPARATUS FOR USING
NON-VOLATILE STORAGE DEVICE

PRIORITY

This application claims priority under 35 U.S.C. §119(a) to Korean Patent Applications filed in the Korean Intellectual Property Office on Jul. 12, 2011 and Mar. 15, 2012 and assigned Serial No. 10-2011-0069158 and Serial No. 10-2012-0026367, respectively, the contents of each of which are incorporated herein by reference.

BACKGROUND OF THE INVENTION

1. Field of the Invention

The present invention relates generally to a non-volatile storage device and more particularly, to a method and apparatus for effectively using a non-volatile storage device, while ensuring the security of the non-volatile storage device.

2. Description of the Related Art

Recently, many types of storage devices have been introduced, such as memory cards using a flash memory as storage means, Universal Serial Bus (USB) memory connectable to a USB port and Solid State Drive (SSD) storage. Recently developed storage devices are characterized by an increased storage capacity, a reduced device size, and an interface detachable from a host device. Therefore, the mobility of storage devices has been enhanced. Further, external hard disks are considered inexpensive storage devices and provide mobility relative to a conventional hard disk installed fixed to a PC.

In addition to storage devices, host devices, which are connected to the storage devices to enable utilization of content stored in the storage devices have also been made smaller and more mobile. In an environment that allows use of digital content stored in a storage device at any time and in any place, content is now distributed in the form of digital data.

However, digital content stored in a storage device is easily duplicated. As such, many techniques for preventing content duplication have been proposed. Although the content duplication prevention techniques are implemented in different manners, the techniques share in common that content utilization is allowed only for authorized persons.

As one of the content duplication prevention techniques, storage devices having a self-authentication function have been developed. For instance, a Secure Digital (SD) card may have a cryptographic function, for data security and a Digital Rights Management (DRM) to control the number of plays and play time, and can be implemented in a secure Multi-Media Card (MMC).

DRM, Content Protection for Recordable Media (CPRM) for SD cards, and Advanced Access Content System (AACS) for Blu-ray Disks™ provide device authentication methods based on Public Key Infrastructure (PKI) or other cryptographic technology.

According to the device authentication methods based on the CPRM and AACS technologies, a device Identifier (ID) unique to a storage device is stored in a read-only area and a cryptographic scheme is applied to the device ID in the process of manufacturing the storage device. A host device then authenticates the storage device using the device ID bound to data stored in the storage device, thereby protecting content.

The storage device may store content corresponding to one or more content applications. Herein, a content application refers to a category into which content can be classified. For example, video content such as movies, game content, and e-book content can be classified respectively into a movie application, a game application, and an e-book application.

Thus, content corresponding to a plurality of content applications can be stored in a single storage device. These content applications stored in the same storage device share the same device ID. Consequently, if the device ID is used inappropriately for any of the applications, the security of the entire system is breached.

That is, since content corresponding to many applications is stored in a storage device using the same device ID irrespective of the security usage of the storage device, occurrence of an inappropriate situation may lead to a discarding of the entire storage device.

SUMMARY OF THE INVENTION

Therefore, the present invention has been made to solve the above-stated problems and/or disadvantages occurring in the prior art, and to provide at least the advantages described below. Accordingly, an aspect of the present invention provides a method and apparatus for allowing only an authorized host device to acquire the device Identifier (ID) of a storage device and store content with security by distinguishing content applications from one another and applying security on a content application basis.

Another aspect of the present invention provides a method and apparatus for acquiring and utilizing content which is stored in a storage device with security applied per content application, according to a security procedure set for a content application corresponding to the content.

Another aspect of the present invention provides a method and apparatus for using a usage ID for each of a plurality of content applications to apply security on a content application basis.

A further aspect of the present invention provides a method and apparatus for using a usage ID for each of a plurality of content applications to apply security on a content application basis, so as to continuously use a security system of a storage device for some content applications even though the device ID of the storage device is disclosed.

According to an embodiment of the present invention, there is provided a method for using a non-volatile storage device in a host device, in which device identification information is read from the non-volatile storage device, application identification information corresponding to a content application related to a type of content to be protected or utilized among a plurality of content applications is acquired, usage identification information is generated using the device identification information and the application identification information, and the content is protected or utilized using the usage identification information.

According to another embodiment of the present invention, there is provided a host device using a non-volatile storage device, in which an ID configurer reads device identification information from the non-volatile storage device, acquires application identification information corresponding to a content application related to a type of content to be protected or utilized among a plurality of content applications, and generates usage identification information using the device identification information and the application identification information, and an ID utilizer protects or utilizes the content using the usage identification information.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF EMBODIMENTS OF THE PRESENT INVENTION

Figure 1:
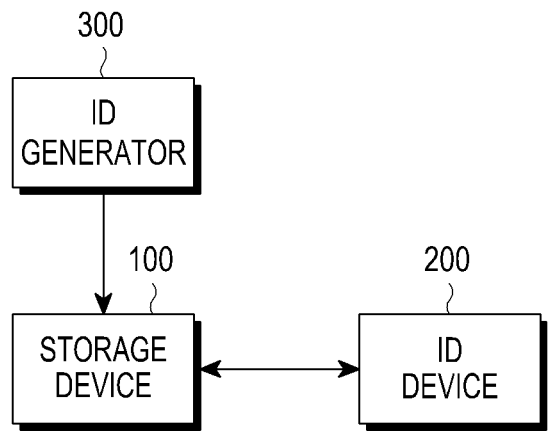
FIG. 1 is a block diagram illustrating a security system according to an embodiment of the present invention.

Various embodiments of the present invention are described in detail with reference to the accompanying drawings. Throughout the drawings, the same or like drawing reference numerals refer to the same or like elements, features and structures. A detailed description of a well-known functions and structures will be omitted to avoid obscuring the subject matter of the present invention.

Digital data stored in a storage device includes content such as music, video, text, images, or computer programs. Content is typically classified into categories. Content applications are defined according to classification criteria of content. Examples of the content applications include music applications, video applications, text applications, image applications, and computer program applications.

If content is an image or text, content utilization includes displaying or printing the content. If content is music or a video, content utilization includes playing back the music or video. If content is a computer program, content utilization includes installation or execution of the computer program. Content utilization also includes copying, moving, or deleting content.

Generally, a device is connected to a storage device, stores content in the storage device, and utilizes the content stored in the storage device. The host device is typically a mobile content utilization device such as a mobile phone, a Personal Digital Assistant (PDA), or an MP3 player, or a fixed content utilization device such as a desktop computer or a digital TV.

According to an aspect of the present invention, the host device generates a usage Identification (ID) for each content application using a device ID specific to a storage device, an application ID specific to a content application, and a random nonce and uses content corresponding to the content application using the usage ID.

The device ID, the application IDs of content applications, and random nonces are preliminarily stored in the process of manufacturing the storage device or during initial use of the storage device. In addition, the device ID, the application IDs of content applications, and the random nonces is encrypted and stored in the storage device. A host encryption key, used for the encryption, is distributed and managed in a validation procedure.

A device ID is specific to each storage device and an application ID is specific to each content application. A random nonce is bounded to a specific application ID, for use in restricting the right of the storage device or the host device to utilize related content or in reinforcing the security of the content.

The storage device stores an identification information assignment table listing locations at which at least one application ID and random nonce are stored. Use of content includes, for example, storing and utilizing content.

FIG. 1 illustrates a security system, according to an embodiment of the present invention. Referring to FIG. 1, the security system includes a storage device 100, a host device 200, and an ID generator 300.

The ID generator 300 generates a device ID specific to the storage device 100 using a parameter input during manufacturing of the storage device 100 and stores device identification information including the device ID in the storage device 100. The device ID can be encrypted. To reinforce the security of the storage device 100, a host encryption key used in encrypting the device ID is transmitted to and managed in the host device 200 in a validation procedure.

The ID generator 300 also determines at least one application ID to be stored in the storage device 100 according to the usage of the storage device 100 or the type of content to be stored in the storage device 100 and generates a random nonce corresponding to the determined application ID. The application ID is an ID assigned to a content application and the random nonce is generated to restrict the access rights of the storage device 100 or the host device 200 to utilize related content or reinforce the security of the content. Accordingly, a random nonce is generated in correspondence to each application ID, or for at least one storage device 100.

The ID generator 300 generates application identification information configured as illustrated in Table 1 and stores the application identification information in the storage device 100.

TABLE 1

| | Description | M/O |
|---|---|---|
| Application ID | ID specific to each content application | M |
| Random nonce | Generated per content application and/or per storage device | M |
| Others | Reserved | |

Referring to Table 1, application identification information is configured for each content application. In Table 1, M stands for "Mandatory," and O stands for "Optional." For example, application identification information is configured for each of music, video, text, image, and computer applications. That is, if video content and music content are to be stored in the storage device 100, video application identification information and music application identification information is configured for the video content and the music content, respectively. The video application information includes a video application ID and a first random nonce, whereas the music application information includes a music application ID and a second random nonce.

The application identification information may also be encrypted and stored in the storage device. A host encryption key used for encrypting the application identification information is transmitted to and managed in the host device 200 in a validation procedure.

When storing the application identification information in the storage device 100, ID generator 300 configures an identification information assignment table indicating locations at which the application identification information is stored and stores the identification information assignment table in the storage device 100. For example, the identification information assignment table is configured as illustrated in Table 2 below.

TABLE 2

|  | Addresses |
|---|---|
| $1^{st}$ application identification information | 1-3 |
| $2^{nd}$ application identification information | 4-7 |
| ... | ... |
| $n^{th}$ application identification information | m-n |

The storage device 100 is a non-volatile memory device including, for example, a NAND-FLASH memory, a NOR-FLASH memory, a hard disk, and/or a Solid State Drive (SSD). The storage device 100 stores the device identification information, the application identification information, the identification information assignment table, and the content. In addition, the storage device 100 provides the stored device identification information, application identification information, and content to the host device 200 upon request of the host device 200 and stores content received from the host device 200.

Figure 2:
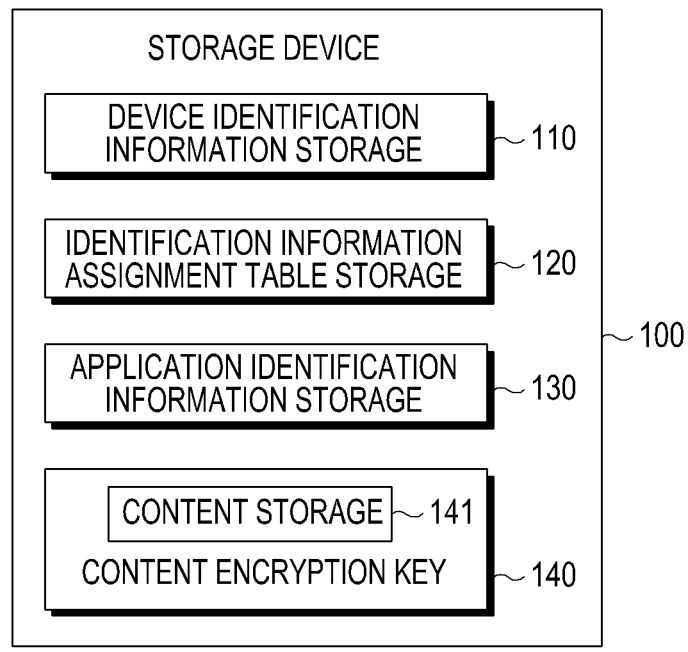
FIG. 2 is a block diagram illustrating a storage device according to an embodiment of the present invention.

The structure of the storage device 100 is illustrated in FIG. 2. FIG. 2 is a block diagram illustrating the storage device according to an embodiment of the present invention. Referring to FIG. 2, the storage device 100 includes a device identification information storage 110, an identification information assignment table storage 120, an application identification information storage 130, and a content storage 140.

The device identification information storage 110 is a storage area configured to store the device identification information. The identification information assignment table storage 120 is a storage area configured to store the identification information assignment table. The application identification information storage 130 is a storage area configured to store the application identification information. The application identification information storage 130 may store a plurality of pieces of application identification information according to usages that the storage device 100 is intended to provide. For example, if the storage device 100 is used for a video application and a computer program application, first application identification information corresponding to the video application and second application identification information corresponding to the computer program application are stored in the storage device 100. Here, the content storage 140 stores video content and computer program content. The content storage 140 is an area configured to store content and a content encryption key 141, used for encrypting the content.

The device identification information storage 110, the identification information assignment table storage 120, and the application identification information storage 130 provide the device identification information, the identification information assignment table, and the application identification information, upon request by the host device 200. Each of the device identification information storage 110, the identification information assignment table storage 120, and the application identification information storage 130 is managed as a locked storage area that cannot be deleted or modified, similarly to a One Time Programmable (OTP) memory.

Figure 3:
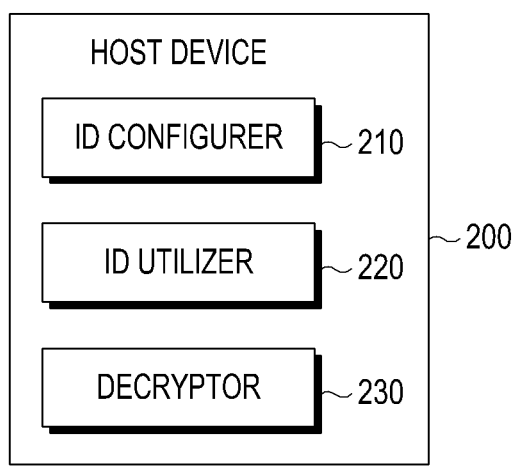
FIG. 3 is a block diagram illustrating a host device according to an embodiment of the present invention.

The host device 200 acquires the device identification information, the identification information assignment table, and application identification information, configures a usage ID using the acquired information, and utilizes content using the usage ID. The structure of the host device 200 is illustrated in FIG. 3. FIG. 3 is a block diagram illustrating the host device according to an embodiment of the present invention.

Referring to FIG. 3, the host device 200 includes an ID configurer 210, an ID utilizer 220, and a decryptor 230.

The ID configurer 210 is configured to read the device identification information from the device identification information storage 110 of the storage device 100. If the read device identification information is encrypted, the ID configurer 210 extracts a device ID from the device identification information using a host encryption key acquired according to a validation procedure.

The ID configurer 210 reads the identification information assignment table from the identification information assignment table storage 120 and determines the location of intended application identification information, referring to the read identification information assignment table. For example, if the identification information assignment table is configured as illustrated in Table 2 and the intended application identification information is the second application identification information in Table 2, the ID configurer 210 determines that the second application identification information is stored at addresses "4-7."

After determining the stored location of the application identification information, the ID configurer 210 reads the application identification information at the stored location. If the read application identification information is encrypted, the ID configurer 210 extracts an application ID and a random nonce from the application identification information in a validation procedure.

The ID configurer 210 determines whether the extracted application ID is an intended application ID. That is, the ID configurer 210 pre-stores information corresponding to the application ID of each content application and thus can determine whether the application ID acquired from the storage device 100 is the intended application ID.

When ID configurer 210 determines that the acquired application ID is correct, it generates a usage ID using the device ID, the application ID, and the random nonce bound to the application ID. Thus, a usage ID is generated for each content application. A cryptographic Hash function as expressed in the following Equation (1), is used in generating a usage ID.

$$\text{Hash}(\text{device ID}, \text{application ID}, \text{random nonce}) = \text{usage ID} \qquad \text{Equation (1)}$$

After generating a usage ID for each content application, the ID configurer 210 outputs the usage ID to the ID utilizer 220. The ID utilizer 220 performs an independent application operation for each corresponding content application using the generated usage ID. For example, the ID utilizer 220 may issue a certificate for the usage ID of each content application and verify the certificate. Since a single storage device may have an individual certificate for each content application, even though the authentication of a specific content application fails, the storage device may still provide functions of the other content applications.

For example, when the storage device 100 is used for a music application and a video application, and stores specific music content and specific video content, the ID utilizer 220 may issue certificates respectively for the music application and the video application using usage IDs of the music and video applications. If the certificate of the music application is discarded, the video content stored in the storage device 100 may still be used although the music content cannot be utilized.

The decryptor 230 is a function block for decrypting encrypted content, for content utilization. The decryptor 230 operates through interaction with the ID utilizer 220.

Figure 4:
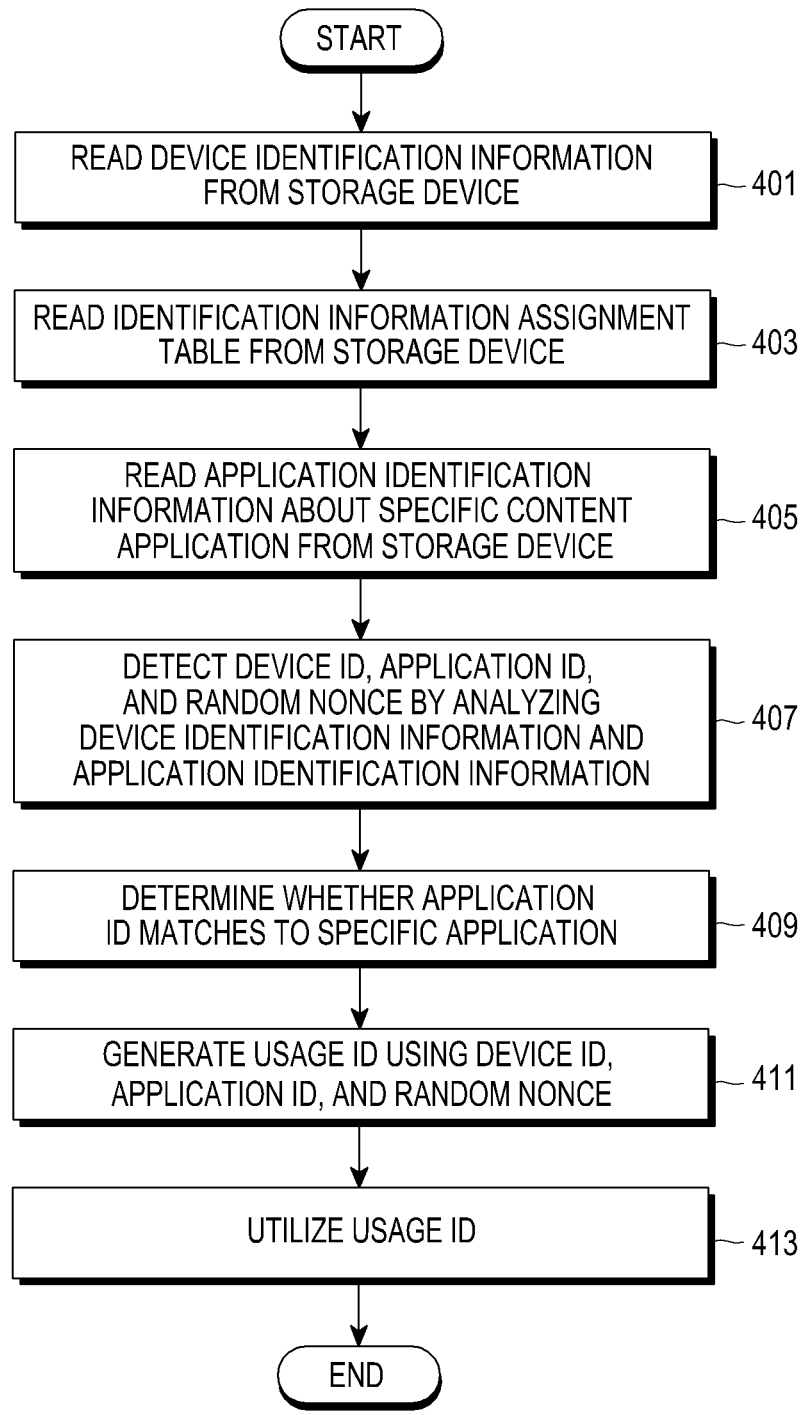
FIG. 4 is a flowchart illustrating an operation of the host device according to an embodiment of the present invention.

The operation of the host device 200 is described below with reference to FIG. 4. The host device 200 is configured to read the device identification information, the identification information assignment table, and application identification information corresponding to a specific content application from the store device 100 in Steps 401, 403 and 405. In Step 407, the host device 200 detects the device ID, an application ID, and a random nonce by analyzing the device identification information and the application identification information. Then the host device 200 determines whether the application ID matches to a specific application in Step 409. If the application ID matches to the specific application, the host device 200 generates a usage ID using the device ID, the application ID, and the random nonce in Step 411 and appropriately uses the usage ID in Step 413.

Figure 5:
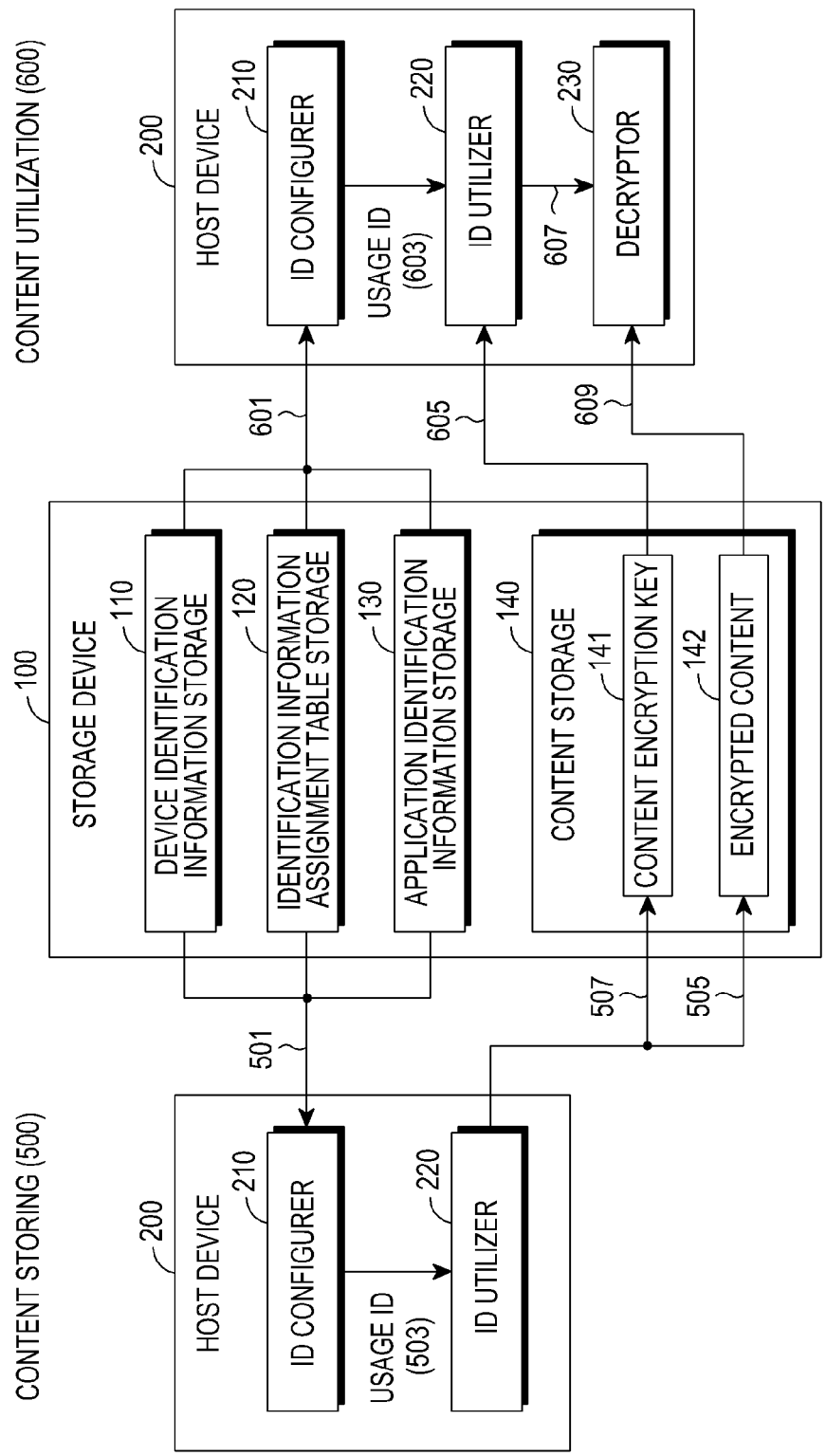
FIG. 5 is a block diagram illustrating an operation for storing and acquiring content according to an embodiment of the present invention.

The operation of the host device 200 will be described with reference to FIG. 5. FIG. 5 illustrates an operation 500 for storing specific content in the storage device 100 and an operation 600 for reading and utilizing the specific content from the storage device 100 according to an embodiment of the present invention. As illustrated in FIG. 5, it is assumed that the host device 200 stores video content in the storage device 100 in Steps 501 to 507 and utilizes the video content stored in the storage device 100 in Steps 601 to 609.

Referring to FIG. 5, the ID configurer 210 of the host device 200 acquires the device identification information from the device identification information storage 110 of the storage device 100 in Step 501. The ID configurer 210 acquires video application identification information from the application identification information storage 130, by referring to the identification information assignment table.

In Step 503, the ID configurer 210 extracts the device ID from the device identification information and extracts an application ID and a random nonce from the video application identification information. Then ID configurer 210 determines whether the extracted application ID is identical to the application ID of the video application. If the application IDs are identical, the ID configurer 210 generates a usage ID using the extracted application ID, device ID, and random nonce and outputs the usage ID to the ID utilizer 220.

The ID utilizer 220 encrypts video content using a content encryption key and stores the encrypted video content 142 in the content storage 140 in Step 505. In Step 507, the ID utilizer 220 encrypts the content encryption key with the usage ID and stores the encrypted content encryption key 141 in the content storage 140.

As described above, the host device 200 generates the usage ID for the video application to store the video content and stores the video content in the storage device 100 using the usage ID.

The video content stored in Steps 501 to 507 is utilized as follows. The ID configurer 220 of the host device 200 acquires the device identification information from the device identification information storage 110 of the storage device 100 in Step 601. The ID configurer 220 acquires the video application identification information from the application identification information storage 130, referring to the identification information assignment table.

In Step 603, the ID configurer 220 extracts the device ID from the device identification information and the application ID and the random nonce from the video application identification information. The ID configurer 220 determines whether the extracted application ID is identical to the application ID of the video application. If the applications IDs are identical, the ID configurer 220 generates a usage ID using the extracted application ID, device ID, and random nonce and outputs the usage ID to the ID utilizer 220.

The ID utilizer 220 reads the content encryption key 141 from the content storage 140 of the storage device 100 in Step 605 and decrypts the content encryption key using the usage ID and outputs the decrypted content encryption key to the decryptor 230 in Step 607.

The decryptor 230 reads the video content 142 stored in the content storage 140 and decrypts the video content 142 with the content encryption key received from the ID utilizer 220 in Step 609. The decrypted video content is reproduced by a media player or the like.

As described above, since security is applied to a plurality of content applications on a content application basis using usage IDs corresponding to the individual content applications, the security system of the storage device can still be used for a part of the content applications even if the device ID of the storage device is compromised.

Although the ID configurer simply checks whether an extracted application ID is identical to an intended application ID to be acquired as described above, the host device may also use an application identification information and/or an identification information assignment table stored within the host device, instead of the application identification information and/or the identification information assignment table stored in the storage device.

Figure 6:
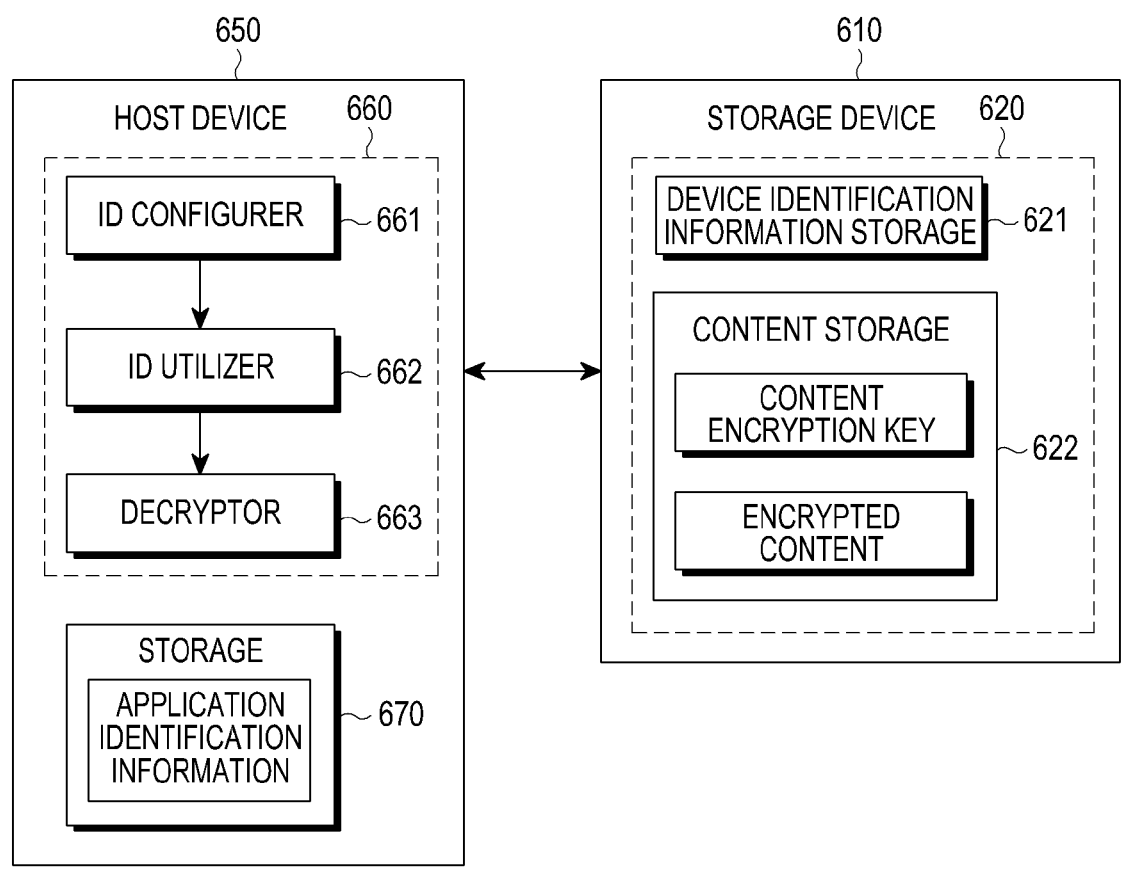
FIG. 6 is a block diagram illustrating a host device and a storage device according to an embodiment of the present invention.

FIG. 6 is a block diagram illustrating a host device and a storage device according to an embodiment of the present invention.

Referring to FIG. 6, a storage device 610 includes a memory 620 having a device identification information storage 621 and a content storage 622. The storage device 610 includes an interface (not shown) configured for data communication with a host device 650 and a controller (not shown) configured for controlling data input and output to and from the memory 620.

The device identification information storage 621 is an area configured to store device identification information corresponding to the storage device 610. The device identification information includes a device ID and can be encrypted. That is, the device identification information storage 621 stores at least one encrypted or non-encrypted device ID (i.e. device identification information) specific to the storage device 610. The device identification information storage 621 may include a plurality of device IDs for identifying a plurality of licensees, a plurality of content applications, or combinations of the content applications, or sequential or optional IDs assigned to the storage device 610. The host device 650 requests a device ID corresponding to a specific licensee, a default device ID, or a non-discarded device ID to the storage device 610 and receives the device ID from the storage device 610.

Although the storage device 610 described above does not include an identification information assignment table storage and an application identification information storage, the storage device 610 may also include the identification information assignment table storage and the application identification information storage, as described above with reference to FIG. 2.

The content storage 622 stores encrypted content and content encryption information. The content encryption information can be a content encryption key itself or an encrypted version of the content encryption key. That is, the content storage 622 receives and stores the encrypted content and the encrypted or non-encrypted content encryption key (i.e. the content encryption information) used in encrypting the content from the host device 650.

The host device 650 includes a controller 660 having an ID configurer 661, an ID utilizer 662, and a decryptor 663, and a storage 670 for storing application identification information. The host device 650 includes an interface (not shown) configured for data communication with the storage device 610.

The ID configurer 661 receives and reads the device identification information from the device identification storage 621 of the storage device 610. The ID configurer 661 may extract a device ID by decrypting an encrypted device ID using a host encryption key acquired in a validation procedure. The host encryption key is received from an ID generator or an external authentication server, or is received and read from the storage device 610 in an additional authentication procedure. The ID configurer 661 may read or receive the device identification information in response to a content save command received from a user or according to an automatic save setting, or automatically upon recognizing the storage device 610.

The ID configurer 661 determines a content application corresponding to content to be stored according to the content save command of the user or the automatic save setting and acquires and reads application identification information corresponding to the determined content application from the storage 670. The application identification information may include an application ID. The application ID can be encrypted.

The ID configurer 661 generates a usage ID based on at least the device identification information and application identification information. When content corresponding to a plurality of different content applications is stored, a plurality of usage IDs is generated for the respective content applications and a random nonce is used to reinforce the security of content, as described above. Therefore, a usage ID can be generated based on a random nonce. The ID configurer 661 provides the usage ID to the ID utilizer 662.

The ID utilizer 662 encrypts a content encryption key using the usage ID or decrypts the encrypted content encryption key using the usage ID. Herein, the content encryption key is based on a random value.

The decryptor 663 receives and reads the encrypted content from the content storage 622 and decrypts the encrypted content using the content encryption key received from the ID utilizer 662.

Figure 7:
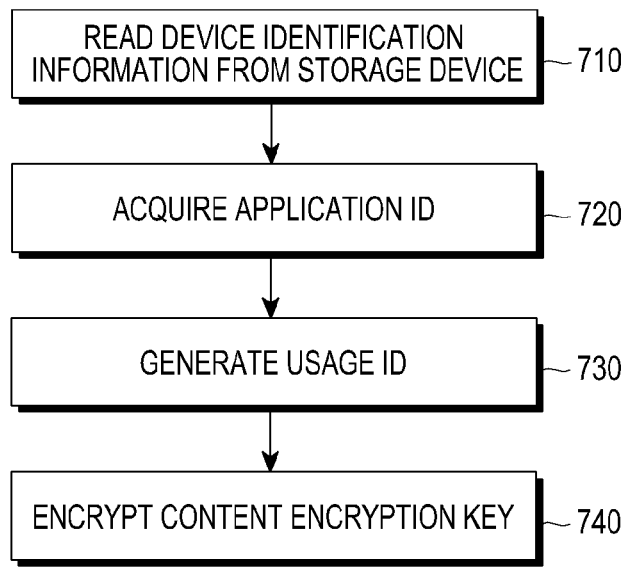
FIG. 7 is a flowchart illustrating a content storing operation of the host device according to an embodiment of the present invention.

FIG. 7 is a flowchart illustrating a content storing operation of the host device according to an embodiment of the present invention.

Referring to FIG. 7, the ID configurer 661 receives and reads device identification information, that is, a device ID from the device identification information storage 621 of the storage device 610 in Step 710. If the device ID is encrypted, the ID configurer 661 decrypts the encrypted device ID.

In Step 720, the ID configurer 661 determines a content application to be stored according to a content save command from a user or an automatic save setting and acquires and reads application identification information corresponding to the determined content application, i.e. the application ID of the determined content application from the storage 670.

The ID configurer 661 generates a usage ID based on at least the device ID and application ID in Step 730.

In Step 740, the ID utilizer 662 encrypts the content (e.g. video content) using a content encryption key based on a random value and stores the encrypted content in the content storage 622. The ID utilizer 662 encrypts the content encryption key with the usage ID and stores the encrypted content encryption key in the content storage 622.

Figure 8:
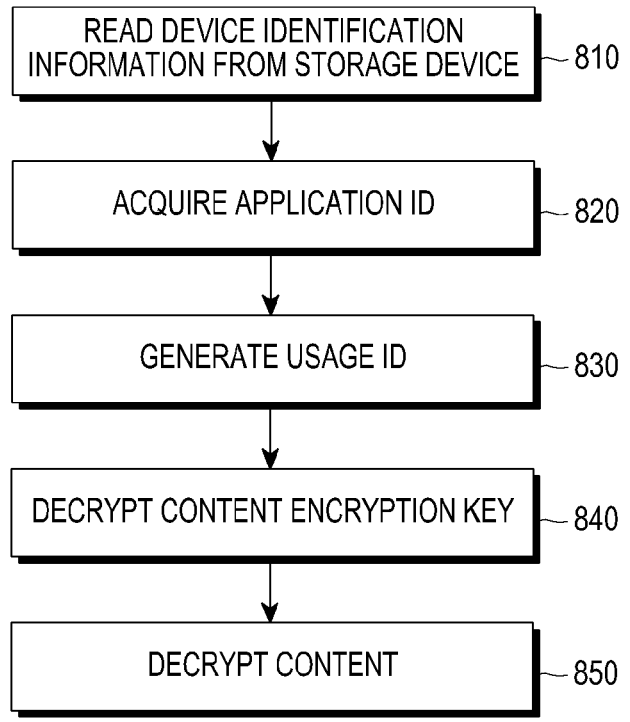
FIG. 8 is a flowchart illustrating a content reproduction operation of the host device according to an embodiment of the present invention.

FIG. 8 is a flowchart illustrating a content reproduction operation of the host device according to an embodiment of the present invention.

Referring to FIG. 8, the ID configurer 661 receives and reads the device identification information, i.e. the device ID from the device identification information storage 621 of the storage device 610 in Step 810. If the device ID is encrypted, the ID configurer 661 decrypts the encrypted device ID.

In Step 820, the ID configurer 661 determines a content application corresponding to content to be played according to a content play command from a user or an automatic play setting and acquires and reads the application ID of the determined content application from the storage 670.

In Step 830, the ID configurer 661 generates a usage ID based on at least the device ID and application ID.

In Step 840, the ID utilizer 662 receives and reads a content encryption key from the content storage 622 of the storage device 610, decrypts the content encryption key using the usage ID, and provides the decrypted content encryption key to the decryptor 663.

In Step 850, the decryptor 663 receives and reads the content from the content storage 622 and decrypts the content using the content encryption key received from the ID utilizer 662. The decrypted video content is played by a media player (a display, a speaker, etc.) provided in the host device 650 or an external media player.

Although a content encryption key is encrypted with a usage ID as described above, the usage ID may also be used for authenticating the storage device on an application basis.

Figure 9:
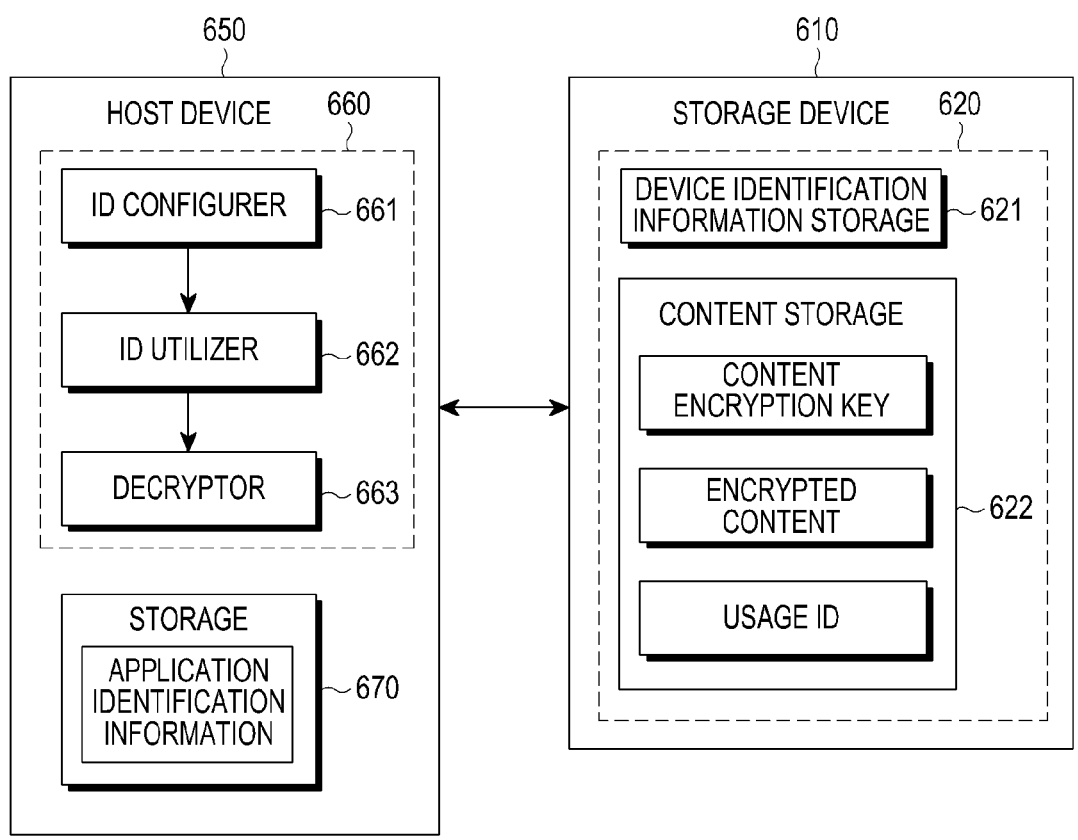
FIG. 9 is a block diagram illustrating an operation for additionally storing a usage Identifier (ID) in the storage device illustrated in FIG. 6, according to an embodiment of the present invention.

FIG. 9 is a block diagram illustrating an operation for storing a usage ID in the storage device illustrated in FIG. 6. Referring to FIG. 9, the content storage 622 receives and stores content, a content encryption key used to encrypt the content, and a usage ID from the host device 650. As illustrated in FIG. 9, the content encryption key is based on a random value.

Figure 10:
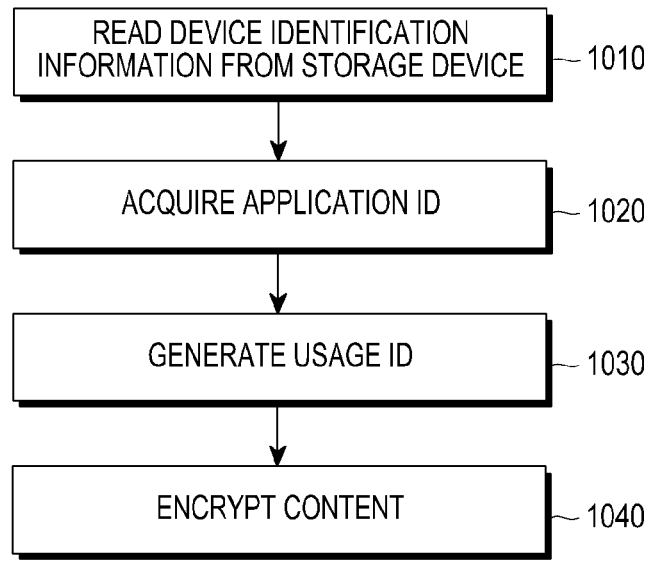
FIG. 10 is a flowchart illustrating a content storing operation of the host device according to a an embodiment of the present invention.

FIG. 10 is a flowchart illustrating a content storing operation of the host device according to an embodiment of the present invention.

Referring to FIG. 10, the ID configurer 661 receives and reads the device identification information, that is, the device ID from the device identification information storage 621 of the storage device 610 in Step 1010. If the device ID is encrypted, the ID configurer 661 decrypts the encrypted device ID.

In Step 1020, the ID configurer 661 determines a content application to be stored according to a content save command from a user or an automatic save setting and acquires and reads application identification information corresponding to the determined content application, i.e. the application ID of the determined content application from the storage 670.

The ID configurer 661 generates a usage ID based on at least the device ID and application ID in Step 1030.

In Step 1040, the ID utilizer 662 encrypts the content (e.g. video content) using a content encryption key based on a random value and stores the encrypted content in the content storage 622. The ID utilizer 662 encrypts the content encryption key with key information other than the usage ID and stores the content encryption key in the content storage 622. The key information is stored in the storage 670 of the host device 650.

Figure 11:
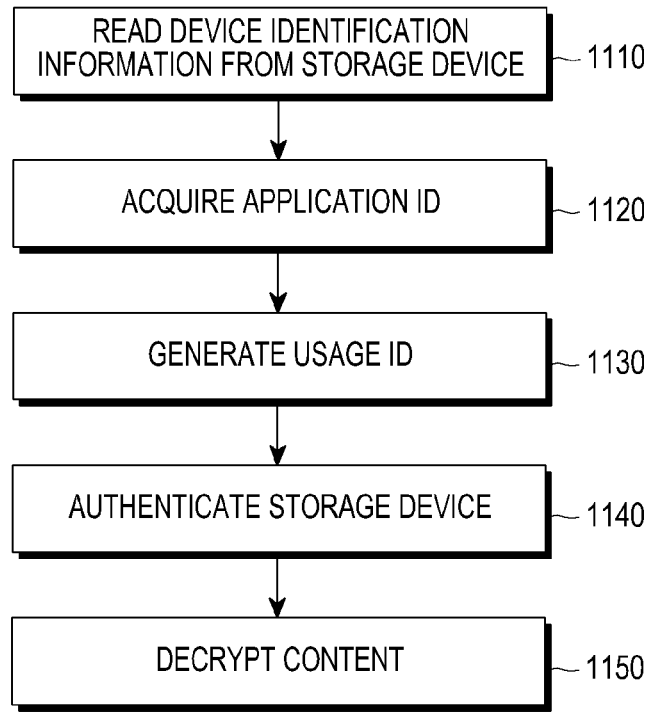
FIG. 11 is a flowchart illustrating a content reproduction operation of the host device according to an embodiment of the present invention.

FIG. 11 is a flowchart illustrating a content reproduction operation of the host device, according to an embodiment of the present invention.

Referring to FIG. 11, the ID configurer 661 receives and reads the device identification information, i.e. the device ID from the device identification information storage 621 of the storage device 610 in Step 1110. If the device ID is encrypted, the ID configurer 661 decrypts the encrypted device ID.

In Step 1120, the ID configurer 661 determines a content application corresponding to content to be played according to a content play command from a user or an automatic play setting and reads and acquires the application ID of the determined content application from the storage 670.

The ID configurer 661 generates a usage ID based on at least the device ID and application ID in Step 1130.

In Step 1140, the ID utilizer 662 receives and reads a usage ID from the content storage 622 of the storage device 610 and authenticates the storage device 610 regarding the content application by comparing the generated usage ID (or configuration information) with the received or read usage ID (or configuration information). If the storage device 610 is successfully authenticated, the host device 650 allows utilization of the content stored in the storage device 610. If the authentication of the storage device 610 fails, the host device 650 does not allow utilization of the content stored in the storage device 610.

If the authentication of the storage device 610 is successful, the decryptor 663 receives and reads the content and the content encryption key from the content storage 622 and decrypts the content using the content encryption key in Step 1150. The decrypted video content is played back by a media player (with a display, a speaker, and the like) provided in the host device 650 or an external media player.

As described above, only an authorized host device can acquire the device ID of a storage device and store content in the storage device by distinguishing content applications from one another and thus applying security to the content on a content application basis. As security is applied per content application, content stored in the storage device can be acquired and utilized according to a security procedure corresponding to the content application of the content. Furthermore, a usage ID is generated for each content application in order to apply security per content application. Therefore, even if the device ID of the storage device is compromised, the area of the content applications can still use the security system of the storage device.

The embodiments of the present invention can be implemented in the form of hardware, software, or a combination of hardware and software. For example, the software can be recorded to a volatile or non-volatile storage device such as a Read Only Memory (ROM), to a memory such as a RAM, a memory chip, a memory device, or an integrated circuit, or to a storage medium that is optically or magnetically recordable and readable by a machine (e.g. a computer), such as a Compact Disk (CD), a Digital Versatile Disk (DVD), a magnetic disk, or a magnetic tape. The storage included in the host device is an example of a machine-readable storage medium suitable for storing programs with coded instructions for implementing the apparatus or method described herein, and a machine-readable storage medium that stores the program. The program can be transferred electronically through any medium such as a communication signal transmitted through a wired or wireless connection.

In addition, the host device can receive and store the program from a program providing device, connected to the host device wirelessly or via cable. The program providing device includes a program with instructions for the host device to perform a preset content protection method, a memory for storing information needed for the content protection method, a communication unit for conducting a wired or wireless communication with the host device, and a controller for automatically transmitting the program to the host device or upon a request by the host device.

While the present invention has been described with reference to various embodiments thereof, it will be understood by those of ordinary skill in the art that various changes in form and detail may be made without departing from the spirit and scope of the present invention as defined by the appended claims and their equivalents.

What is claimed is:

1. A method for utilizing content stored in a storage device by a host device, comprising:
   reading, by the host device, an encrypted device identification (ID) from the storage device;
   decrypting, by the host device, the encrypted device ID with an encryption key;
   reading, by the host device, an application ID assigned to a content application;
   generating, by the host device, usage information using the device ID and the application ID;
   reading an encrypted key from the storage device;
   decrypting the encrypted key; and
   decrypting encrypted content read from the storage device using the key when the generated usage information is identical to usage information received from the storage device,
   wherein the encrypted device ID is stored in a first storage area of the storage device which is a read-only area and the encrypted content is stored in a second storage area of the storage device which is a read-write area.

2. The method of claim 1, wherein the content is utilized by one of displaying the content, printing the content, reproducing the content, executing the content, copying the content, moving the content, and deleting the content.

3. The method of claim 1, further comprising:
   preventing decryption of the content when the generated usage information is not identical to the usage information received from the storage device.

4. The method of claim 1, wherein the key is a random number.

5. The method of claim 1, wherein the application ID is stored in the host device.

6. A non-transitory machine-readable storage medium storing a program instructing a processor in a host device to execute a method for utilizing content stored in a storage device, the method comprising:
   reading, by the host device, an encrypted device identification (ID) from the storage device;
   decrypting, by the host device, the encrypted device ID with an encryption key;
   reading, by the host device, an application ID assigned to a content application;
   generating, by the host device, usage information using the device ID and the application ID;
   reading an encrypted key from the storage device;
   decrypting the encrypted key; and
   decrypting encrypted content read from the storage device using the key when the generated usage information is identical to usage information received from the storage device, wherein the encrypted device ID is stored in a first storage area of the storage device which is a read-only area and the encrypted content is stored in a second storage area of the storage device which is different from the first storage area.

7. A host device utilizing content stored in a non-volatile storage device, comprising:
   a storage which stores an application identification (ID) assigned to a content application; and
   a controller which:
      reads an encrypted device ID from the storage device;
      decrypts the encrypted device ID with an encryption key;
      reads the application ID;
      generates usage information using the device ID and the application ID;
      reads an encrypted key from the storage device;
      decrypts the encrypted key; and
      decrypts encrypted content read from the storage device using the key when the generated usage information is identical to usage information received from the storage device,
   wherein the encrypted device ID is stored in a first storage area of the storage device which is a read-only area and the encrypted content is stored in a second storage area of the storage device which is different from the first storage area.

8. The host device of claim 7, wherein the controller prevents utilization of the encrypted content when the generated usage information is not identical to usage information received from the storage device.

9. The host device of claim 7, wherein the content is utilized by one of displaying the content, printing the content, reproducing the content, executing the content, copying the content, moving the content, and deleting the content.

10. The host device of claim 7, wherein the key is a random number.

11. The host device of claim 7, wherein the application ID is stored in the host device.

12. A storage device, comprising:
   a first storage area comprising a read-only area which stores an encrypted device identification (ID); and
   a second storage area comprising a read-write area which stores content;
   wherein the storage device is configured to:
      allow a host device to read the encrypted device ID;
      allow a host device to read an encrypted key;
      allow a host device to read usage information; and
      allow a host device to access encrypted content stored in the second storage area; and
   wherein the host device decrypts the encrypted content when the usage information read from the storage device is identical to usage information generated by the host device using a decrypted version of the encrypted device ID and an application ID assigned to a content application.

13. The storage device of claim 12, wherein the key is a random number.

* * * * *